Nov. 27, 1956   J. S. DE LUCIA   2,772,029
MEANS FOR FILLING GREASE CUPS ON AUTOMOTIVE VEHICLES
Filed June 20, 1955   2 Sheets-Sheet 1
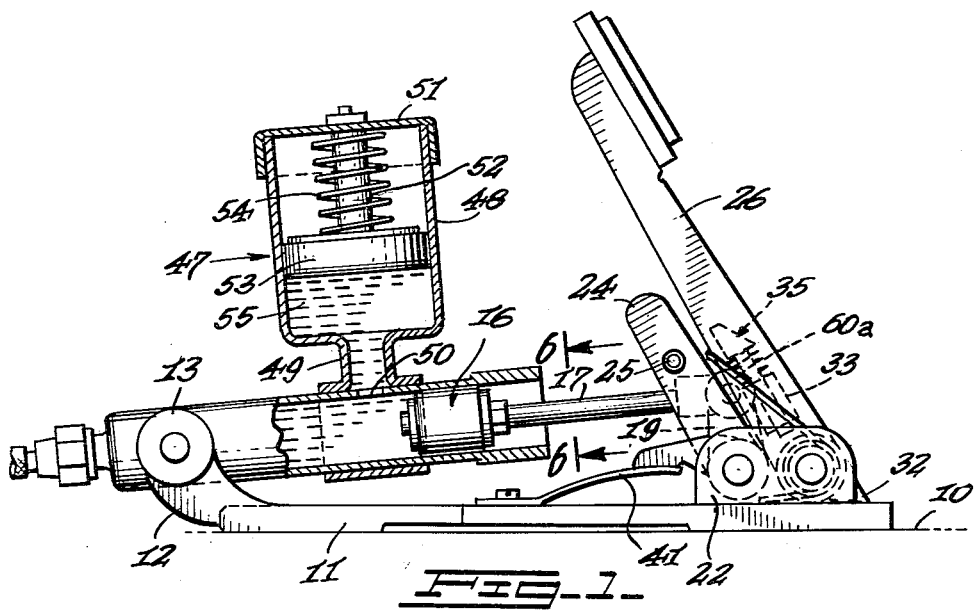
FIG. 1.
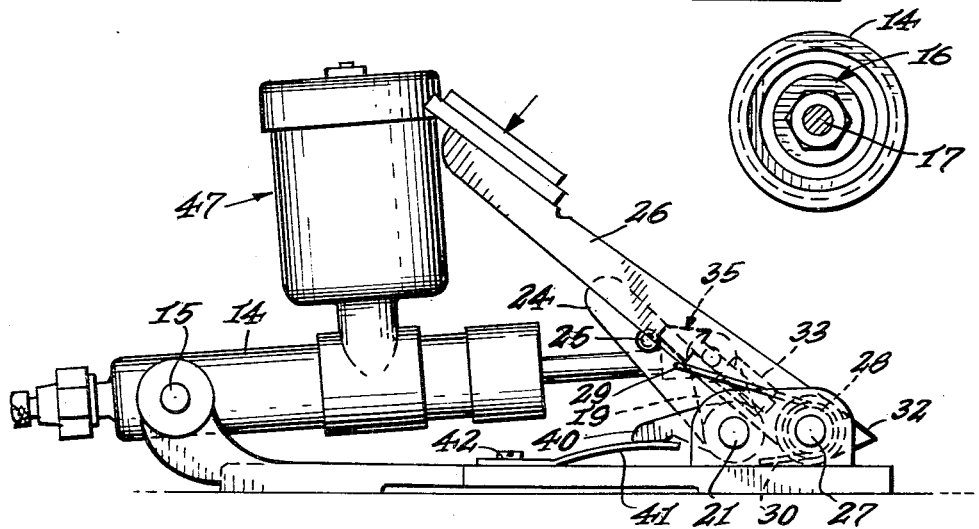
FIG. 2.
FIG. 6.
INVENTOR.
J. S. DE LUCIA.
BY J. Ledermann
ATTORNEY.

Nov. 27, 1956   J. S. DE LUCIA   2,772,029
MEANS FOR FILLING GREASE CUPS ON AUTOMOTIVE VEHICLES
Filed June 20, 1955   2 Sheets-Sheet 2
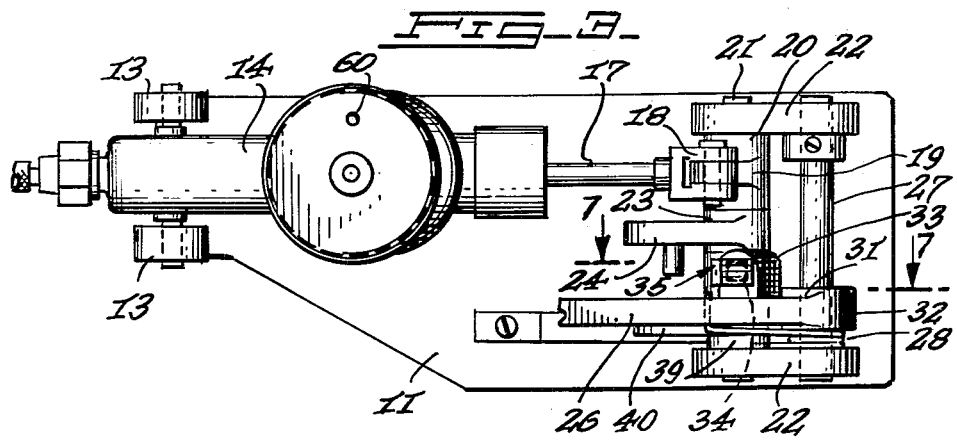
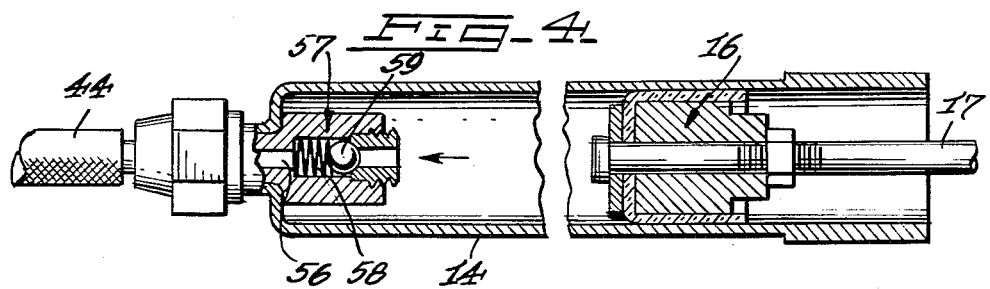
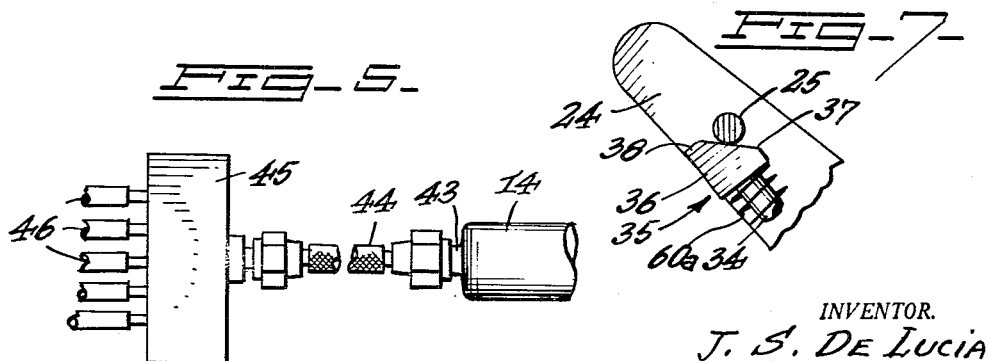
INVENTOR.
J. S. DE LUCIA.
BY
ATTORNEY.

United States Patent Office 2,772,029
Patented Nov. 27, 1956

2,772,029

MEANS FOR FILLING GREASE CUPS ON AUTOMOTIVE VEHICLES

Jerry S. De Lucia, Bronx, N. Y.

Application June 20, 1955, Serial No. 516,407

7 Claims. (Cl. 222—179)

This invention relates to feeding lubricating grease to the numerous parts of an automobile chassis, which are commonly supplied with grease from time to time by means of a grease gun; this job is usually done at a service station and entails considerable loss of time on the part of the motorist.

The main object of the present invention is the provision of a novel, improved and practical lubricating means for the above purpose, which is entirely contained within the vehicle, with suitable connections to all of the grease cups of the vehicle, whereby the operator may, without any loss of time and whenever such greasing is in order, feed grease simultaneously into all of the cups by the simple application of force on a lever, preferably a pedal situated convenient to the driver.

Another object of the invention is the provision of means for limiting the amount of grease expelled during a single depression of the pedal to prevent forcing too much grease into the grease cups.

The above broad as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown except insofar as they may be deemed essential to the invention.

Referring briefly to the drawing,

Fig. 1 is a side elevational view, with parts broken away and partly in section, of a pedal-operated force feed device for forcing grease into a main tube adapted to lead to a manifold.

Fig. 2 is a side elevational view of the device shown in Fig. 1, with the pedal moved into operative position.

Fig. 3 is a plan view of the device, with the pedal in inoperative position.

Fig. 4 is a longitudinal sectional view through the operative cylinder of the device.

Fig. 5 is a fragmentary view showing the connection of the main tube leading from the cylinder into a manifold from which a plurality of tubes lead to the various grease cups of the vehicle.

Fig. 6 is a sectional view taken on the line 6—6 of Fig. 1.

Fig. 7 is a fragmentary sectional view taken on the line 7—7 of Fig. 3, but showing a detail in position intermediate between the normal inoperative and the depressed operative positions of the pedal.

Referring in detail to the drawing, the numeral 10 indicates the floor of, say, the driver's compartment of an automotive vehicle. The device of this invention includes a base 11 which is mounted on the said floor or other suitable support, by any suitable means, not shown. An upwardly extending bracket 12 on the forward end of the base 11 provides a pair of aligned trunnions 13. A cylinder 14 has aligned pins 15 extending from one end thereof and registering pivotally in the trunnions 13.

A piston 16, normally positioned as shown in Fig. 1 nearer the rear end of the cylinder, is slidable in the cylinder and its piston rod 17 has its rear end pivoted at 18 to the end of a short arm or lug 19 extending rigidly from a sleeve 20. The latter is on a pin 21 rotatably supported in the forward ends of supports 22 extending upward from the base 11.

A second sleeve 23 is also on the pin 21 adjacent the sleeve 20 and is provided, rigid therewith, a relatively longer arm 24 having a cylindrical pin 25 rigid thereon, positioned substantially as shown intermediate, approximately, the height of the arm 24 and extending from that side thereof opposite the sleeve 20. A pedal arm or operating lever arm 26 has its lower end pivoted on a pin 27 supported between the rear ends of the supports 22 and parallel with the pin 21. A coiled spring 28 has one end 29 deformed and engaged under the pedal 26 and the other end 30 engaged against the base 11, thus normally urging the pedal into clockwise rotation, Figs. 1 and 2. Any suitable limit stop means may be provided to prevent swinging, clockwise, of the pedal 26 beyond the normal inoperative position of Fig. 1; for example, the bearing sleeve 31 integral with the pedal, by means of which the latter is pivoted on the pin 27, may have an eccentric extension 32 engaging the base 11 in the normal position of the pedal. Rigid with the pedal 26 on that side thereof facing the arm 24 is a block 33 having a non-cylindrical passage therethrough substantially parallel with the pedal 26 so that a pin 34 which registers therein slidably is constrained against turning; preferably the cross-sections of both the passage and the pin 34 are square. This pin has a head 35 whose front face 36 is flat and whose rear face 37 is also flat but at an acute angle to the face 36. The top of the head 35 is also flat and positioned at right angles to the front face 36, as shown at 38.

A third sleeve 39 is also rigid on the pin 21, between the sleeve 23 and the adjacent support 22. All of the sleeves 20, 23 and 39 may be made rigid with the pin or shaft 21 by keying the same to the shaft, not shown, or by any other means, or all three may be part of a single elongated sleeve of which the parts 20, 23 and 39 may be considered sections. The sleeve 39 has an eccentric nose 40 rigid therewith and extending forward, the underside of which is engaged by the free end of an arched band or leaf spring 41 anchored at 42 to the base 11. The position of maximum expansion of the spring 41 is shown in Fig. 1, whence the normal position of the arm 24, also shown in Fig. 1, is maintained by this spring.

The outlet end 43 of the cylinder 14 is connected by a pipe or hose 44 to a manifold 45, from which the desired number of hoses or pipes 46 lead to the various grease cups of the vehicle.

A grease supply chamber or well 47 is mounted on the cylinder in upright position, substantially as shown in Figs. 1 and 2, and comprises the large cup or housing 48 having a reduced neck 49 communicating through an opening 50 into the cylinder, with the interior of the latter. The housing 48 has a removable cap 51, secured thereon frictionally or by screw threads, not shown. A stem 52 extends slidably through the cap 51 and has a piston 53 on the lower end thereof. A coiled spring 54 surrounding the stem between the cap and the piston normally urges the piston 53 downward. After the housing has been nearly filled with grease 55, the cap 51 is put in place with the spring 52 fully compressed, whence, the piston 53 urges the grease downward into the cylinder 14 forward of the cylinder piston 16, that is, when the pedal 26 is in its normal inoperative position.

The operation of the device is as follows. When it is desired to force grease into the various grease cups of the vehicle, the pedal 26 is depressed into the position shown in Fig. 2. As the pedal moves from its normal position, it is apparent from Fig. 1, that the front face 36 of the head 35 on the square pin 34 will engage the pin 25 on the arm 24 and thus swing the latter counterclockwise and force the piston 16 farther into the cylinder 14, thus forcing grease out of the cylinder and through the various hoses 46 into the grease cups. Since it is desirable to limit the amount of grease thus expelled to avoid forcing too much grease into the cups, upon a single depression of the pedal 26, provision has been made for this factor. As the pedal continues its downward movement, and since the pedal and the arm 24 swing on spaced parallel axes, the pin 25 will in time ride over the front face 36 of the head 35 (which it is just about to do in Fig. 2) so that the piston 16 will be forced in no farther. As the pedal continues its downward movement beyond the position shown in Fig. 2, the pin 25 will ride over the top 38 of the head 35 and then down the inclined rear side 37, as shown in Fig. 7. Upon release of the pedal to be restored by the spring 28 to its normal position, the pin 25 will ride in the reverse direction to that just described over the head 35, that is, up the surface 37, over the top 38, and back down and then clear of the front surface 36, back into its original position shown in Fig. 1. The spring 41, as previously stated, restores the arm 24 to its said original position.

As the piston 16 is thus also returned to its original position shown in Fig. 1, it is desirable that it take in from the supply chamber 47 the amount of grease which has been expelled in the discharging operation. For this purpose the outlet passage 56 through the cylinder 14 is provided with a normally closed ball valve and coiled spring arrangement indicated in Fig. 4 by the numeral 57. Since such valves are common and well known, it is believed unnecessary to describe the same in detail, except to say that the valve is normally closed by its spring 58 and is automatically opened upon the application of pressure in the cylinder against its ball 59. Thus, return of the piston 16 to its original position permits the spring 58 to close the valve 57, so that the suction of the moving piston is transferred to the passage 50 and grease is sucked into the cylinder, with the aid of the spring 54. A vent 60 is provided in the housing cap 51 to permit air to enter the housing 48 as grease leaves the same.

In reference to the head 35 on the pin 34 which is slidable in the block 33, a coiled spring 60a between the head and the block normally urges the pin and hence its head upward into substantially the position shown in Fig. 1.

Thus an efficient and safe device has been provided to force a limited amount of grease into each of the grease cups of a vehicle upon a single depression of a pedal.

I claim:

1. In a device of the class described, a cylinder having an outlet at its front end, a base having a raised portion at the front thereof, said cylinder being pivoted near said end thereof to said raised portion, a piston slidably mounted in the cylinder and having a piston rod extending from the rear end of the cylinder, an operating lever arm pivoted on an axis substantially parallel with the pivotal axis of the cylinder near the rear end of said rod, a shaft rotatably mounted at substantially the level of the pivotal axis of said lever above the base and positioned forward of said pivotal axis of the lever, said shaft having a sleeve fixed thereon, said sleeve having a lug thereon, the rear end of said rod being pivoted to said lug, a second sleeve fixed on said shaft adjacent said first sleeve and having a lug thereon, said second lug having a pin extending from that side thereof opposite said first sleeve, said shaft having a third sleeve fixed thereon, a member on that side of said lever adjacent said second sleeve so positioned thereon to engage said pin upon swinging of said lever in one direction and thus to swing said second lug in the same direction and hence to move said piston rod and said piston forward in said cylinder to force grease through the piston outlet, resilient means for restoring said lugs and hence said piston to their original inoperative positions, a grease supply chamber having an outlet into said cylinder on the outlet side of the piston, and means in said chamber normally urging the grease therein into the cylinder, said cylinder having a check valve in the outlet thereof normally closed except when the piston is moving toward the front end of the cylinder.

2. In a device of the class described, a base having a raised portion at the front end thereof, a cylinder having an outlet in its front end and having said end pivoted to said raised portion, said cylinder having a piston slidable thereon and a piston rod extending from the rear end of the piston, a cylindrical member rotatably mounted on an axis parallel with the pivotal axis of the cylinder, said member having a lug extending at right angles therefrom, the rear end of said rod being pivoted to said lug, said member having a second lug extending at right angles therefrom, an operating lever pivoted rearward of said member on an axis parallel with said first-named axis, means partly on said lever and partly on said second lug for engagement of said second lug by said lever during operative swinging of said lever in one direction thereby swinging said second lug in the same direction and pushing said piston inward into the cylinder whence said cylinder forces grease through said outlet, a grease supply chamber having an outlet into the cylinder between the ends of the cylinder, and a check valve in the cylinder outlet having means for closing the same except during forward movement of the piston, resilient means for restoring said lever to inoperative position, resilient means for restoring said member and hence said piston to inoperative position upon release of said engaging means on said lever and said second lug, said piston during restoring to inoperative position sucking grease into the cylinder from said chamber, said cylinder outlet being adapted to be connected to a plurality of grease cups.

3. The device set forth in claim 2, said first-named means comprising a pin on said second lug and a member on said lever engageable by said pin.

4. The device set forth in claim 2, said first-named means comprising a pin on said second lug, a block on said lever, said block having a passage therethrough substantially parallel with said lever, a pin slidably mounted in said passage and having a head thereon spaced above said block, resilient means normally urging said last-named pin upward into a position wherein the front face of said head engages said first-named pin during said operative movement of the lever, said head having a top surface, said head having a depth such that upon forward movement of the piston through a given distance said first-named pin rides over said front surface onto said top surface of the head and upon continuance of said operative movement of the lever said first-named pin pushes said head and hence said last-named pin downward into said block passage against the force of said last-named resilient means and hence said head ceases to move said piston forward beyond said given distance, said first-named pin riding over said top surface of the head in a reverse direction during restoring of said second lug to original inoperative position by said second-named resilient means.

5. The device set forth in claim 2, said first-named means including means for disengaging said first-named means after forward movement of said piston through a given distance thus releasing said second lug to permit restoring of the same and hence of the piston to their original inoperative positions.

6. The device set forth in claim 4, said head having a rear surface inclined to both said top and front surfaces, said first-named pin upon additional operative swinging of said lever riding over said top surface and down said rear surface and upon restoring of said lever to original inoperative position riding back up said rear surface before riding reversely over said top surface as aforesaid.

7. A device of the class described comprising a cylinder having an outlet at the front end thereof, said front end of the cylinder being pivoted on a support, said cylinder having a piston slidable therein, said piston having a rod extending from the rear end thereof, a member rotatably mounted on an axis parallel with the pivotal axis of the cylinder, said member having a lug extending therefrom, said rear end of the rod being pivoted to said lug, an operating lever pivotally mounted on an axis rearward of and parallel with said last-named axis, and means partly on said member and partly on said lever for engaging said lug by said lever during operative swinging of the lever and for discontinuing engagement of the lug by the lever at an interval before the operative movement of the lever has been completed, means for restoring said lug to original inoperative position after said discontinuing of said engagement, said first-named means thereby limiting the quantity of discharge from said cylinder through said outlet during one operative swinging of the lever, and means for restoring said lever to inoperative position, a supply chamber having an outlet into said cylinder between the ends of the cylinder, said first-named outlet having a check valve therein normally closed except while said piston is moving forward.

References Cited in the file of this patent

UNITED STATES PATENTS

| | | |
|---|---|---|
| 1,621,172 | MacKenzie | Mar. 15, 1927 |
| 1,750,150 | Albertine | Mar. 11, 1930 |
| 1,804,731 | Albertine | May 12, 1931 |